(12) United States Patent
Simpson et al.

(10) Patent No.: US 7,763,192 B2
(45) Date of Patent: Jul. 27, 2010

(54) RESIN TRANSFER MOLDING TO TOUGHEN COMPOSITE BEAM KEYS

(75) Inventors: Allen H. Simpson, Buchanan, MI (US); Mark L. La Forest, Granger, IN (US); Slawomir T. Fryska, Granger, IN (US)

(73) Assignee: Honeywell International Inc., Morris Township, NJ (US)

( * ) Notice: Subject to any disclaimer, the term of this patent is extended or adjusted under 35 U.S.C. 154(b) by 980 days.

(21) Appl. No.: 11/389,022

(22) Filed: Mar. 27, 2006

(65) Prior Publication Data

US 2009/0236763 A1 Sep. 24, 2009

Related U.S. Application Data

(60) Provisional application No. 60/670,230, filed on Apr. 12, 2005.

(51) Int. Cl.
*B29C 45/14* (2006.01)
*C01B 31/02* (2006.01)
*B64C 25/00* (2006.01)

(52) U.S. Cl. .................. 264/29.5; 264/162; 264/279; 427/249.4

(58) Field of Classification Search ................. 264/257, 264/29.5, 279, 162; 427/249.4
See application file for complete search history.

(56) References Cited

U.S. PATENT DOCUMENTS

| | | | |
|---|---|---|---|
| 3,829,162 A | 8/1974 | Stimson et al. | |
| 4,297,307 A | 10/1981 | Taylor | |
| 4,311,661 A | 1/1982 | Palmer | |
| 5,045,356 A * | 9/1991 | Uemura et al. | 427/249.2 |
| 5,230,946 A * | 7/1993 | Fisher | 428/212 |
| 5,232,650 A | 8/1993 | Behan et al. | |
| 5,306,448 A | 4/1994 | Kromrey | |
| 5,614,134 A * | 3/1997 | Sohda et al. | 264/29.1 |
| 5,714,104 A | 2/1998 | Bailey et al. | |
| 6,325,608 B1 | 12/2001 | Shivakumar et al. | |
| 6,517,769 B2 | 2/2003 | Eschenfelder et al. | |
| 6,537,470 B1 * | 3/2003 | Wood et al. | 264/29.5 |
| 2002/0153648 A1 | 10/2002 | Lawson | |
| 2003/0145447 A1 | 8/2003 | Moseley et al. | |
| 2006/0006729 A1* | 1/2006 | Rutten | 301/6.2 |
| 2006/0151912 A1* | 7/2006 | Bauer | 264/257 |

* cited by examiner

*Primary Examiner*—Matthew J. Daniels
(74) *Attorney, Agent, or Firm*—Birch, Stewart, Kolasch & Birch, LLP

(57) ABSTRACT

Method of manufacturing composite wheel beam key by: forming entirely from carbon fiber precursors or from carbon fiber precursors and ceramic materials a fibrous preform blank in a shape of a desired wheel beam key, wherein the fiber volume fraction of the preform blank is at least 50%; carbonizing the carbon fiber precursors; rigidifying the carbonized preform blank by subjecting it to at least one cycle of CVD; grinding the surface of the preform blank to open pores on its surface; and subjecting the open-pored preform blank to RTM processing with pitch. Also, carbon-carbon composite or carbon-ceramic composite wheel beam key produced by this process, having a density of from 1.5 g/cc to 2.1 g/cc and a maximum internal porosity of 10% or less.

3 Claims, 1 Drawing Sheet

RESIN TRANSFER MOLDING TO TOUGHEN COMPOSITE BEAM KEYS

This application claims priority to provisional application Ser. No. 60/670,230, filed Apr. 12, 2005. The contents of Ser. No. 60/670,230 are expressly incorporated by reference herein.

FIELD OF THE INVENTION

The present invention relates to wheel beam keys such as are utilized in aircraft wheel and beam key assemblies. In accordance with this invention, the wheel beam keys are composed of carbon-carbon composite or carbon-ceramic composite materials.

BACKGROUND OF THE INVENTION

Aircraft brakes typically are made with a stack of alternatively interleaved stator and rotor discs, the discs being adapted for selective factional engagement with one another. The stator discs are typically splined to the axle of the aircraft, while the rotors are keyed to the wheel, generally by a series of beam keys that are circumferentially spaced about an inner portion of the wheel and that engage key slots in the outer circumferential surface of the rotors. The beam keys typically have one end thereof pinned to the wheel and an opposite end thereof mounted to an outrigger flange of the wheel.

Application Ser. No. 11/073,309, filed 7 Mar. 2005, entitled COMPOSITE WHEEL BEAM KEY, discloses wheel beam keys that are made from a mostly unidirectional carbon-carbon composite material. In addition to carbon-carbon composite materials, however, that invention also contemplates composite beam keys made with hybrid fibers (carbon or ceramic) and/or hybrid matrices (carbon or ceramic). For example, a wheel beam key of that invention may be made using two cycles of carbon densification followed by one cycle of treatment with SiC carbide or another ceramic. While the carbon-carbon composite beam keys of that invention will generally have anti-oxidant and/or wear coatings applied to them, when ceramic matrices are used, the ceramic will often provide sufficient oxidative and wear resistance.

Still another embodiment of the invention of application Ser. No. 11/073,309 is a method of manufacturing a composite wheel beam key. This method includes the steps of: forming—entirely from carbon fibers or from carbon fibers and ceramic materials—a fibrous preform blank in a shape of a desired wheel beam key: and densifying the fibrous preform to produce a carbon-carbon composite in the shape of said wheel beam key. When the fibrous preform is manufactured entirely from carbon fiber precursors, it is preferable that a majority of the fibers in the preform be oriented in the length direction of the key and a minor portion of the fibers in the preform extend in the other two perpendicular directions of the key. The resulting C—C composite wheel beam key may be immersed in antioxidant to provide an antioxidant-coaled carbon-carbon composite wheel beam key. Also, a hard, wear-resistant coating may be applied to the antioxidant-coated beam key.

In a typical embodiment of the invention described in application Ser. No. 11/073,309, the beam key is made from PAN-based carbon fibers with a carbon matrix, with the carbon matrix being densified either entirely by CVI/CVD processing or by a combination of CVI/CVD processing and pitch infiltration, followed by carbonization. Alternatively or in addition to PAN-based carbon fibers, pitch-based carbon fibers and rayon-based carbon fibers may also be used in that invention. Also, the invention of application Ser. No. 11/073,309 contemplates utilizing mixed-source carbon fibers (e.g., PAN and pitch fibers) or ceramic fibers (e.g., PAN and/or pitch and/or rayon and/or oxidized PAN and/or SiC and $Al_2O_3$ fibers), possibly combined with hybrid matrices (e.g., charred resins/CVI/charred pitch or charred phenolic with SiC, $B_4C$, SiN, etc.). Thus that invention includes structural carbon-carbon composites, such as carbon fiber CVD-densified composites and carbon fiber CVD/pitch-densified composites and carbon fiber/phenolic-densified composites. That invention also contemplates structural carbon/ceramic composites, such as carbon/ceramic fiber combinations densified with carbon/ceramic matrices, etc. Such materials provide improved wear resistance and "built in" antioxidant properties. Examples of this approach include carbon fiber/ceramic fiber composites densified with CVD and/or pitch and/or resin, and carbon fiber and/or ceramic fiber composites densified with CVD and/or pitch and/or resin, with silicon infusion to provide SiC ceramic matrix material.

The entire disclosure of application Ser. No. 11/073,309 is incorporated by reference herein.

U.S. patent application Ser. No. 11/073,907, filed Mar. 7, 2005, entitled MOLD FIXTURE TO DENSIFY COMPOSITE BEAM KEY USING RESIN TRANSFER MOLDING, describes one way in which composite wheel beam keys such as those described in application Ser. No. 11/073,309 can be manufactured. The RTM processes in that application may involve vacuum pitch impregnation. The entire disclosure of application Ser. No. 11/073,907 is incorporated by reference herein.

SUMMARY OF THE INVENTION

The present invention provides pitch-impregnated carbon-carbon composites using Resin Transfer Molding (RTM). Vacuum pitch impregnation may be difficult to implement in the production of wheel beam key composite preforms, due to the very high fiber volume fraction therein. The present invention provides a modified RTM process in which higher pressures enable more complete impregnation of the preform. This invention thus produces tougher wheel beam composite preforms.

Preforms may be constructed with various architectures in accordance with the present invention, depending e.g. upon the strength required. In a preferred embodiment, the preform is constructed of oxidized polyacrylontrile (PAN) fiber and has a fiber volume fraction of at least 50%. Even more preferredly, at least 80% of the fiber in the preform is oriented parallel to the length of the beam key. The preform is carbonized using standard methods well known to those skilled in the art. In accordance with this invention, carbonization is followed by at least one Chemical Vapor Deposition (CVD) cycle to rigidify the preform. After CVD, the preform is ground or otherwise abraded in order to open pores at its surface. The porous-surfaced preform is then subjected to RTM processing one or more times. RTM processing may be accomplished with any conventional pitch material, whether petroleum-based, coal-derived, or of synthetic origin. In accordance with the present invention, the pitch is heated to 50° C. or more above its softening point. The pitch is then forced into the pores of the preform at a pressure of 500 psi to 3500 psi.

BRIEF DESCRIPTION OF THE DRAWINGS

The present invention may be more fully understood from the detailed description given below and the drawings that accompany this specification. The drawings are given by way of illustration only, and thus are not limiting of the present invention. The drawings are not necessarily to scale.

DETAILED DESCRIPTION OF THE INVENTION

The method of manufacturing a composite wheel beam key in accordance with the present invention includes five steps. First, a fibrous preform blank in a shape of a desired wheel beam key is formed, entirely from carbon fiber precursors or from carbon fiber precursors and ceramic materials. In this preform blank, the fiber volume fraction is at least 50%. Second, the carbon fiber precursors are carbonized. Third, the carbonized preform blank is rigidified by subjecting it to at least one cycle of chemical vapor deposition ("CVD"). Fourth, the surface of the preform blank is ground, in order to open pores on its surface. Fifth, the open-pored preform blank is subjected to resin transfer molding ("RTM") processing with pitch.

In preferred embodiments, the fibrous preform blank formed in the first step may be formed entirely of oxidized polyacrylonitrile ("PAN") fibers. Also, approximately 80% of the fibers in the preform blank may be oriented parallel to the length of the preform blank.

In other preferred embodiments, the pitch employed in the fifth step may be a petroleum-based pitch, a coal-derived pitch, or a pitch of synthetic origin. Also, the pitch may be heated to 50° C. or more above its softening point and then forced into the pores of the preform blank at a pressure of 500 psi to 3500 psi.

Figure 1:
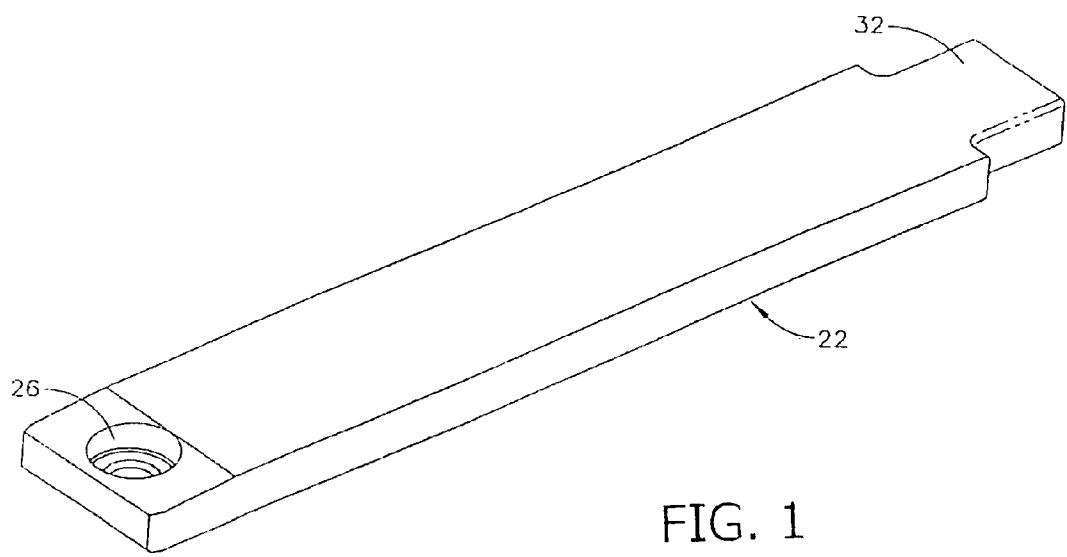
FIG. 1 is an isometric view of a beam key in accordance with this invention.

Another aspect of the present invention is a carbon-carbon composite or carbon-ceramic composite wheel beam key produced by the process described herein. This wheel beam key may be configured as a generally rectangular body having a neck area located at one end thereof and a through bore located at the opposite end thereof. FIG. 1 shows a beam key 22, having at one end thereof a counter bore 25 and at an opposite end thereof a neck area 32. A typical beam key could be, for instance, about 13 inches in length, about 2 inches wide, and about 0.6 inches thick.

Figure 2:
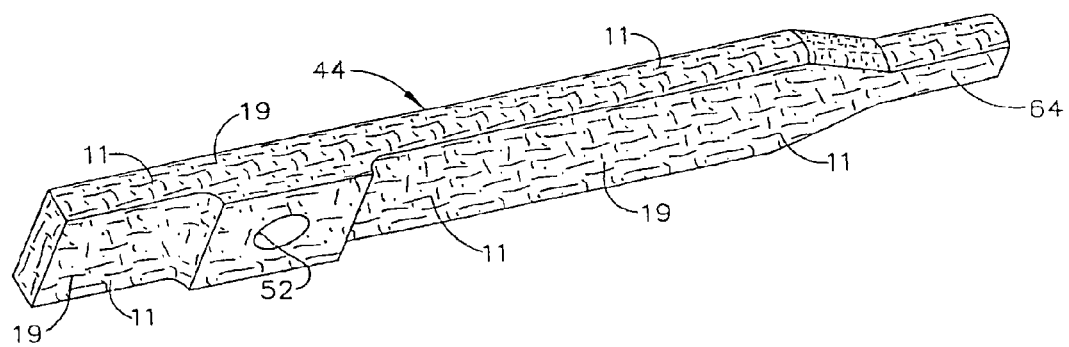
FIG. 2 is a perspective view of an alternate beam key embodiment of the invention.

FIG. 2 shows a beam key 44, which is adapted for interconnection with an aircraft wheel. Beam key 44 includes a through counter bore 52 adapted for receiving a bolt secured to an outrigger boss in the wheel and a pin 64 provided at an end of the beam key and adapted for receipt in a bore provided within the wheel. In FIG. 2, fibers 11 represent fibers oriented generally parallel to the shank of the beam key, and fibers 19 represent fibers oriented through the thickness and width of the beam key. This fiber orientation contributes to the structural integrity of the preform.

In a preferred embodiment, the carbon-carbon composite wheel beam key may have a density of from 1.5 g/cc to 2.1 g/cc. In another preferred embodiment of the invention, the carbon-carbon composite wheel beam key of may have a maximum internal porosity of 10% or less.

While particular embodiments of the invention have been described for purposes of illustration, it will be understood that various changes and modifications within the spirit of the invention can be made, and the invention is not to be taken as limited except by the scope of the appended claims.

What is claimed is:

1. A method of manufacturing a composite wheel beam key which comprises the sequential steps of:
    forming, entirely from oxidized polyacrylonitrile (PAN) fibers, a fibrous preform blank in a shape of a wheel beam key having a configuration comprising a rectangular body with a neck area located at an end thereof and a through bore located at an opposite end thereof, wherein the fiber volume fraction of said preform blank is at least 50% and wherein 80% of the fibers in the preform blank are oriented parallel to the length of the preform blank;
    carbonizing the oxidized polyacrylonitrile fibers to form carbon fibers;
    rigidifying the carbonized preform blank by subjecting it to at least one cycle of CVD;
    grinding the surface of the preform blank to open pores on its surface; and
    subjecting the open-pored preform blank to RTM processing with pitch by heating the pitch to 50° C. or more above its softening point and then forcing the pitch into the pores of the preform blank at a pressure of 500 psi to 3500 psi, followed by carbonization,
    thereby producing a composite wheel beam key having a maximum internal porosity of 10% of less and having a density of from 1.5 g/cc to 2.1 g/cc.

2. The method of claim 1, wherein the pitch employed in said RTM processing is a petroleum-based pitch, a coal-derived pitch, or a pitch of synthetic origin.

3. The method of claim 1, wherein the pitch is heated to 50° C. above its softening point and the pitch is then forced into the pores of the preform blank at a pressure of 500 psi to 3500 psi.

* * * * *